(12) United States Patent
Bhatti

(10) Patent No.: US 11,777,350 B2
(45) Date of Patent: Oct. 3, 2023

(54) INTEGRATED ROTOR

(71) Applicant: ZF Active Safety US Inc., Livonia, MI (US)

(72) Inventor: Irfan Bhatti, Farmington Hills, MI (US)

(73) Assignee: ZF Active Safety US Inc., Livonia, MI (US)

( * ) Notice: Subject to any disclaimer, the term of this patent is extended or adjusted under 35 U.S.C. 154(b) by 56 days.

(21) Appl. No.: 16/587,087

(22) Filed: Sep. 30, 2019

(65) Prior Publication Data

US 2022/0399769 A1 Dec. 15, 2022

Related U.S. Application Data

(60) Provisional application No. 62/741,285, filed on Oct. 4, 2018.

(51) Int. Cl.
*H02K 1/30* (2006.01)
*H02K 11/21* (2016.01)
*H02K 1/278* (2022.01)

(52) U.S. Cl.
CPC .............. *H02K 1/30* (2013.01); *H02K 1/278* (2013.01); *H02K 11/21* (2016.01)

(58) Field of Classification Search
CPC ........... H02K 1/30; H02K 11/21; H02K 1/278
USPC ................. 310/43, 216.022, 261.1, 406, 412
See application file for complete search history.

(56) References Cited

U.S. PATENT DOCUMENTS

| | | | |
|---|---|---|---|
| 6,680,553 B1 * | 1/2004 | Takano | H02K 29/08 310/68 B |
| 7,350,283 B2 | 4/2008 | Won et al. | |
| 8,593,027 B2 | 11/2013 | Marchitto et al. | |
| 10,253,676 B2 | 4/2019 | Gossling et al. | |
| 2017/0317539 A1 | 11/2017 | Starke | |

FOREIGN PATENT DOCUMENTS

| | | | |
|---|---|---|---|
| CN | 202172314 U | * | 3/2012 |
| DE | 102008001539 A1 | | 11/2009 |
| DE | 102012202529 A1 | | 8/2013 |
| EP | 2632035 B1 | | 8/2019 |
| JP | 2000152524 A | | 5/2000 |
| JP | 3589266 82 | | 8/2004 |
| JP | 2007221866 A | * | 8/2007 |
| JP | 2012165534 A | * | 8/2012 |
| TW | I236202 B | * | 7/2005 |
| WO | 2017133784 A1 | | 8/2017 |
| WO | WO2018134988 A1 | * | 7/2018 |

* cited by examiner

*Primary Examiner* — Jose A Gonzalez Quinones
(74) *Attorney, Agent, or Firm* — Robert James Harwood

(57) ABSTRACT

A rotor for a motor includes a sensor ring, a rotor shaft and an over-molded body configured to couple the sensor ring to the rotor shaft. The rotor may further include at least one magnet and a magnet support where the magnet support is disposed between the at least one magnet and the rotor shaft. The over-molded body couples the sensor ring, the rotor shaft, the magnet support and the at least one magnet to each other.

11 Claims, 8 Drawing Sheets shaft/carrier and plastic shown

INTEGRATED ROTOR

CROSS-REFERENCE TO RELATED APPLICATIONS

This application claims priority to U.S. Provisional Patent Application No. 62/741,285, filed on Oct. 4, 2018 the disclosure of which is incorporated herein by reference in its entirety.

TECHNICAL FIELD

The present disclosure relates to a rotor used in a motor.

BACKGROUND OF THE DISCLOSURE

There are various techniques used to attach permanent magnets in a rotor assembly for a permanent magnet motor and other permanent magnet machines. However, traditional techniques typically require the assembly of several parts which increase cost and manufacture time.

Therefore, in electric motors, it is desirable to reduce the number and complexity of machined parts in order to reduce costs and manufacturing time. Further, it is advantageous to reduce the weight of moving motor components to diminish the moment of inertia of the motor when operating in dynamic situations for quick start and stop application.

SUMMARY OF THE DISCLOSURE

This disclosure relates in general to a rotor of an electric motor. More specifically, this disclosure pertains to a permanent magnet rotor wherein the rotor is formed using permanent magnets secured to a carrier and over-molded with plastic. The disclosure further relates to a method for producing the rotor.

In a first embodiment, a rotor for a motor includes a sensor ring, a rotor shaft and an over-molded body configured to couple the sensor ring to the rotor shaft. The rotor may further include one or more magnets and a magnet support where the magnet support is disposed between at least one magnet and the rotor shaft. The over-molded body couples sensor ring, the rotor shaft, the magnet support and the at least one magnet to each other.

Specifically, the over-molded body may couple one or more magnets to the sensor ring. The over-molded body may also couple the aforementioned magnet(s) to the rotor shaft. Additionally, the over-molded body may couple the aforementioned magnet(s) to the magnet support. The rotor of the present disclosure may further include at least one (removable) protrusion defined in the over-molded body such that the at least one protrusion is configured to balance the rotor. The protrusion(s) may be provided in various forms dome shaped, short cylindrical shaped or the like. The aforementioned protrusion or protrusions may be defined on an outer surface of the over-molded body.

In another embodiment of the present disclosure, a motor may be provided having a stator; and a rotor having a sensor ring, a rotor shaft and an over-molded body configured to couple the sensor ring to the rotor shaft. The motor may further include at least one magnet coupled to the sensor ring via the over-molded body. The at least one magnet may also be coupled to the rotor shaft via the over-molded body. The motor of this embodiment may further include a magnet support at least partially disposed within the over-molded body wherein the over-molded body couples the magnet support to the at least one magnet.

Moreover, at least one protrusion may be defined in the over-molded body in the motor's rotor wherein one or more of the protrusions is removable and is configured to balance the motor. It is understood that the protrusion(s) may be defined on an outer surface of the over-molded body.

BRIEF DESCRIPTION OF THE DRAWINGS

One set of black and white line drawings and one set of color drawings are submitted for the following figures:

FIG. 3 is a cross-sectional view taken along the line 3-3 of FIG. 2a,
FIG. 4 is a cross-sectional view taken along the line 4-4 of FIG. 2a,
FIG. 5a is a cross-sectional view of the rotor assembly of FIG. 5c along line 5a-5a.

DETAILED DESCRIPTION

Figure 1:
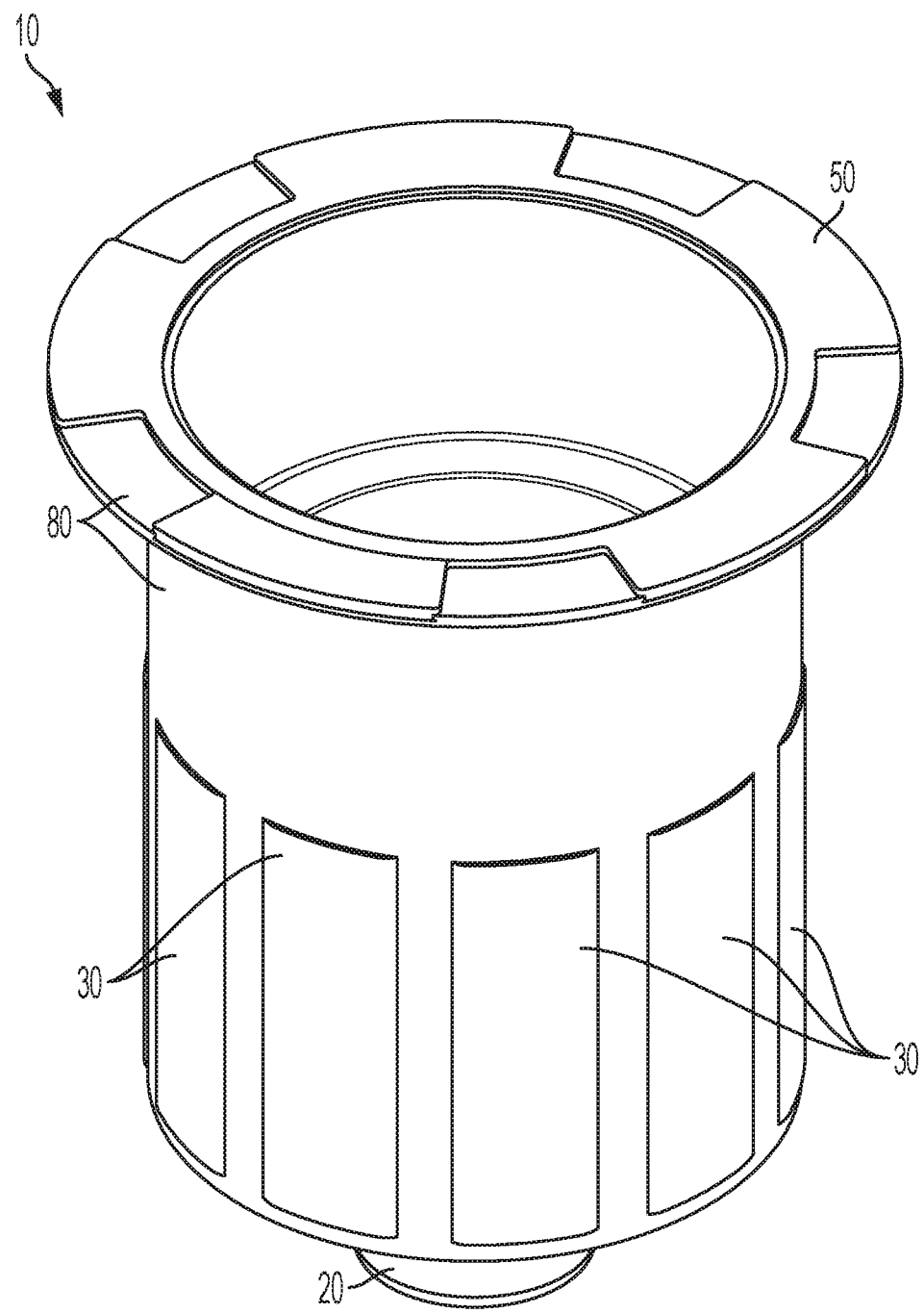
FIG. 1 is a perspective view of the rotor assembly.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2A:
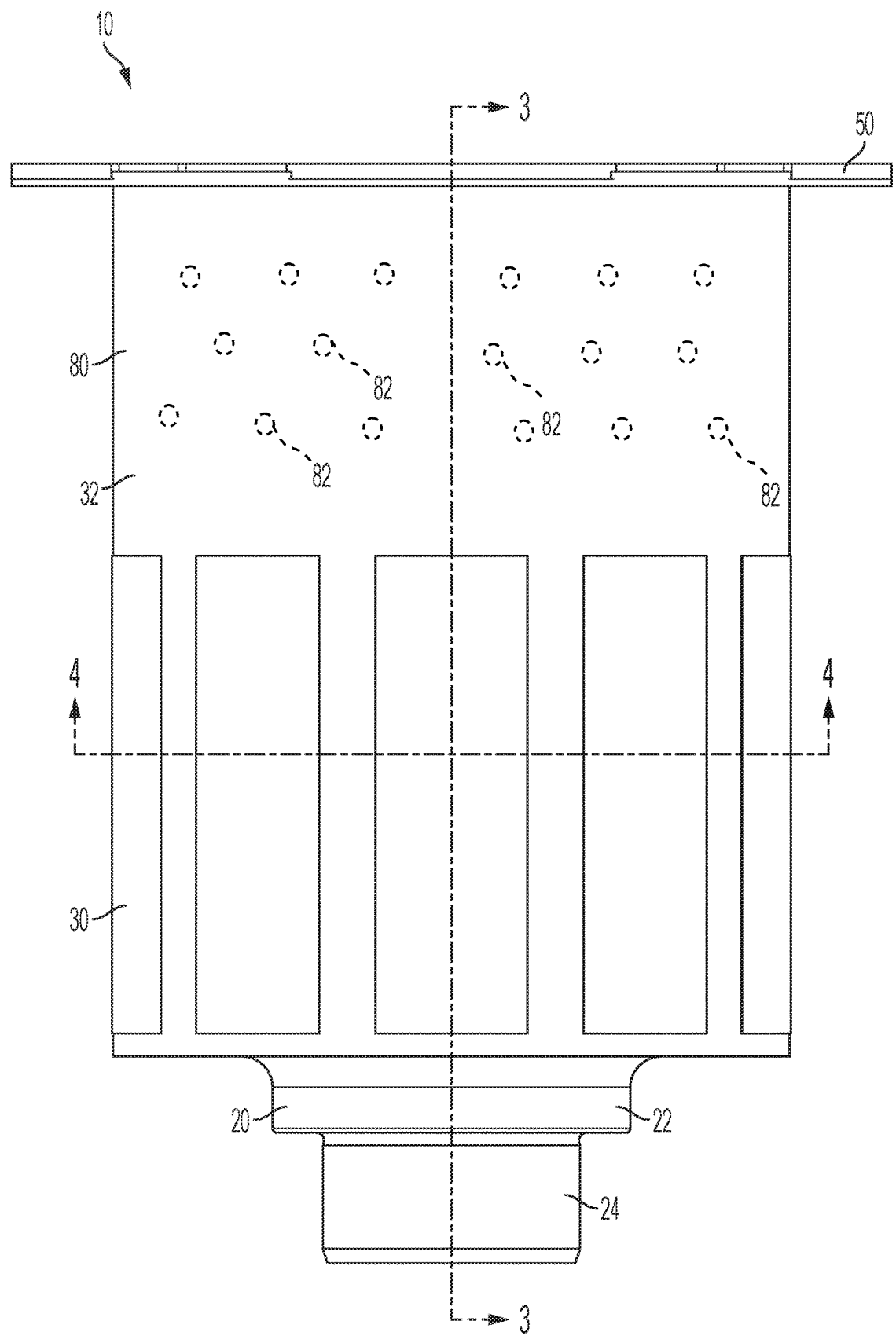
FIG. 2a is a side view of the rotor assembly of FIG. 1.
Figure 2B:
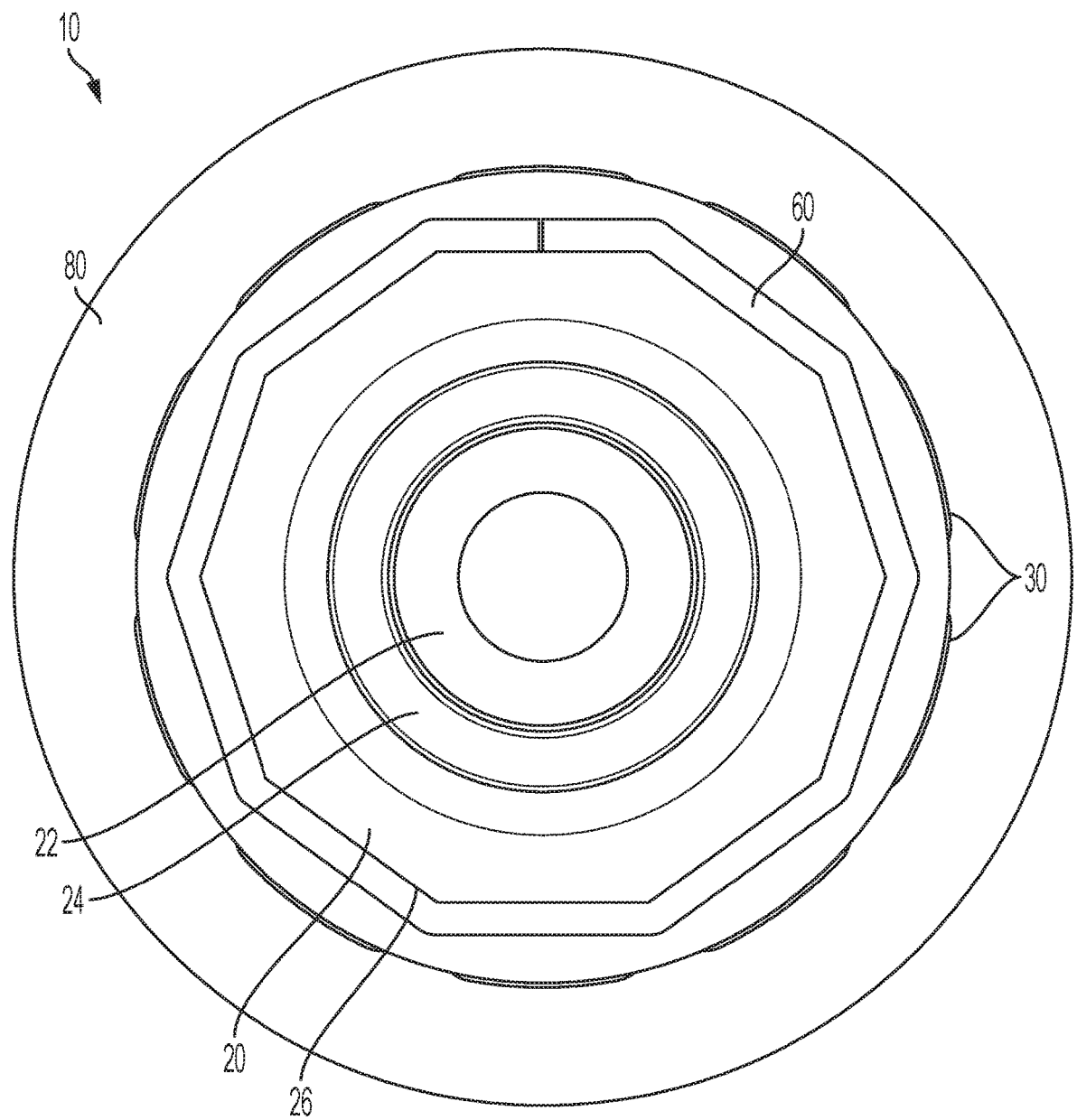
FIG. 2b is a bottom view of the rotor assembly of FIG. 1.

Referring now to the drawings, there is illustrated in FIG. 1 a rotor assembly, indicated generally at 10. The rotor assembly 10 is a permanent magnet rotor driven by a stator (not shown). The rotor assembly 10 comprises a rotor shaft 20 at a base of the rotor assembly 10. The rotor shaft 20 is configured to drive a rotatable element, such as a ball screw (not shown) or other rotatable shaft element (not shown). The rotor shaft 20 may further be configured to engage a bearing mounted to a motor housing. As best illustrated in FIG. 2a, the rotor shaft 20 may comprise several stepped portions 22 and 24, of varying diameters corresponding to the bearing diameter. As shown in FIG. 2b, the rotor shaft 20 further comprises an outermost diameter 26 that is secured to a magnet support 60.

Magnet support 60 is a generally annular shaped metallic support that is configured to support a plurality of magnets 30 on the outer surface 32 of the magnet support. The magnet support 60 may be created as a machined part, sintered, deep-drawn, or by other manufacturing means. For example, the magnet support 60 can be machined from a block of metal or formed from a sheet of metal and into an annular shape. The magnet support 60 is welded to the rotor shaft 20 at the outermost diameter 26. However, the magnet support 60 connection to the rotor shaft 20 may be accomplished by other means know to those skilled in the art. For example, FIG. 5g shows an interlocking toothed connection between the rotor shaft 20 and the magnet support 60. The magnets 30 are proximate to the magnet support 60 and may be secured directly to the magnet support 60 or indirectly connected to the magnet support by an over-molded body 80.

As shown in FIG. 2a, the over-molded body 80 extends between the rotor shaft 20 and a sensor ring 50. In production, the rotor shaft 20 and magnet support 60 are secured together. The combined parts are then placed in a mold with magnets 30 around magnet support 60 and sensor ring 50 at a top location. The body 80 is then created via an over-molding process that further secures the magnets 30 in place and connects the sensor ring 50 to the motor shaft 20. Various elements of the rotor assembly 10 may have features that assist the over-molded body 80 to be secured to the elements. For example, the sensor ring 50 may have blind holes, tabs, or other features that allow the over-molded body 80 to further interface with the sensor ring 50.

In addition, it is within the scope of the disclosure that the amount of plastic used in the over-molded body 80 can be adjusted. For example, the thickness of the over-molded body 80 can be made thinner for weight reduction or increased for balance and strength purposes. The over-molded body 80 may also have various apertures or slits in the body 80 to allow the magnets and/or magnet support 60 to be exposed to air. This can enable better heat dissipation in the metallic parts and improve motor performance. Further, the over-molded body can be made of a variety of materials. While standard plastics or nylon impregnated plastics can be utilized, it is with the scope of the disclosure that other materials can be present in the over-molded body. For example, the body 80 can have metallic particles or elements that improve the magnetic field of the magnets 30.

The over-molded body 80 can further have additional elements or surface textures to allow balancing. For example, protrusions 82 can be provided or defined on the outer surface 32 of the over-molded body 80 such that one or more protrusions 82 are removable and can removed to varying degrees to balance the rotor assembly 10. Alternatively, other features such as a groove or a slot (not shown) may be made along the outer surface 32 of the over-molded body 80 for similar balancing purposes. In addition, it is within the scope of the disclosure that the rotor assembly 10 may be balanced using additive manufacturing processes.

Figure 3:
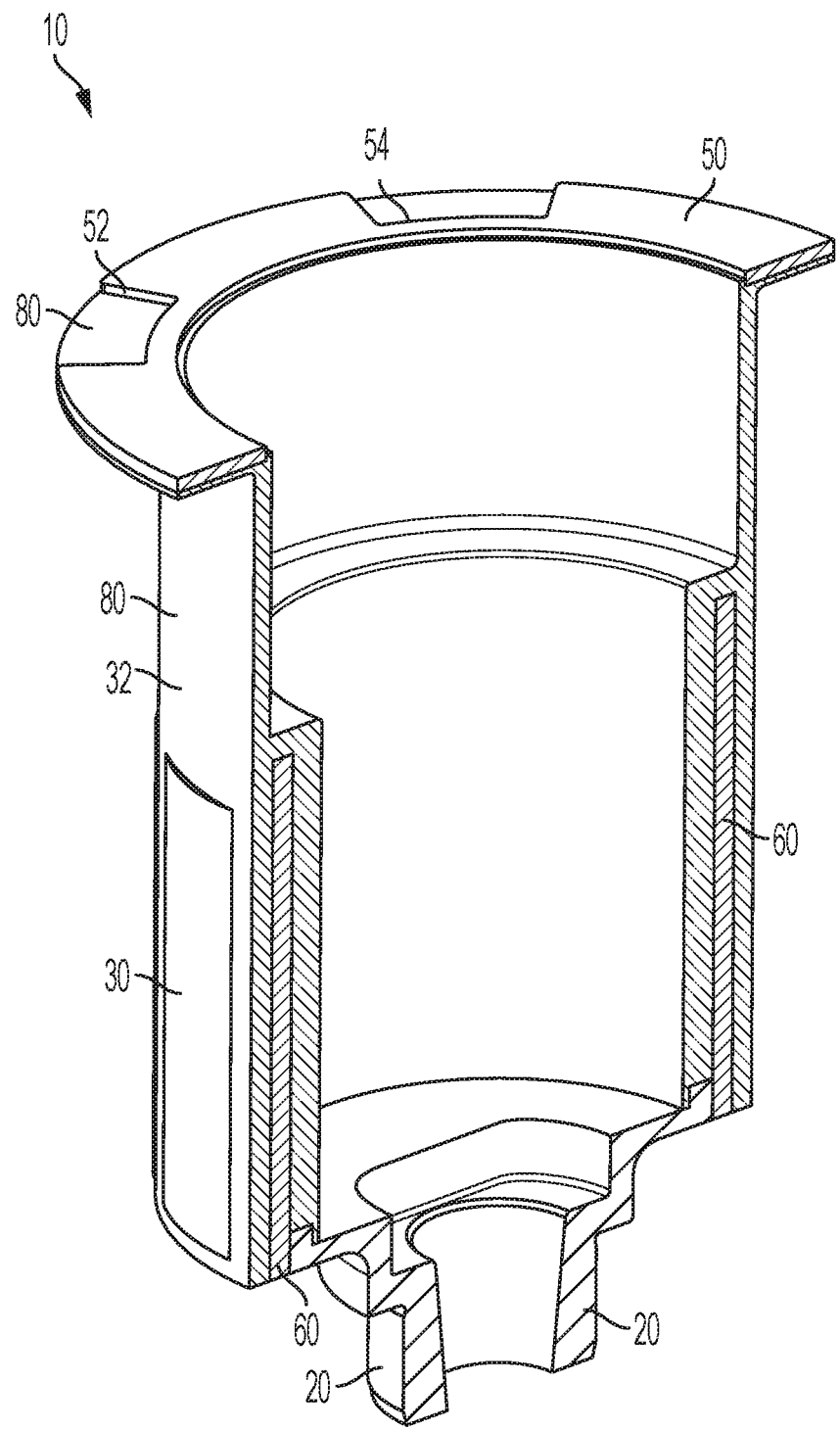
Figure 4:
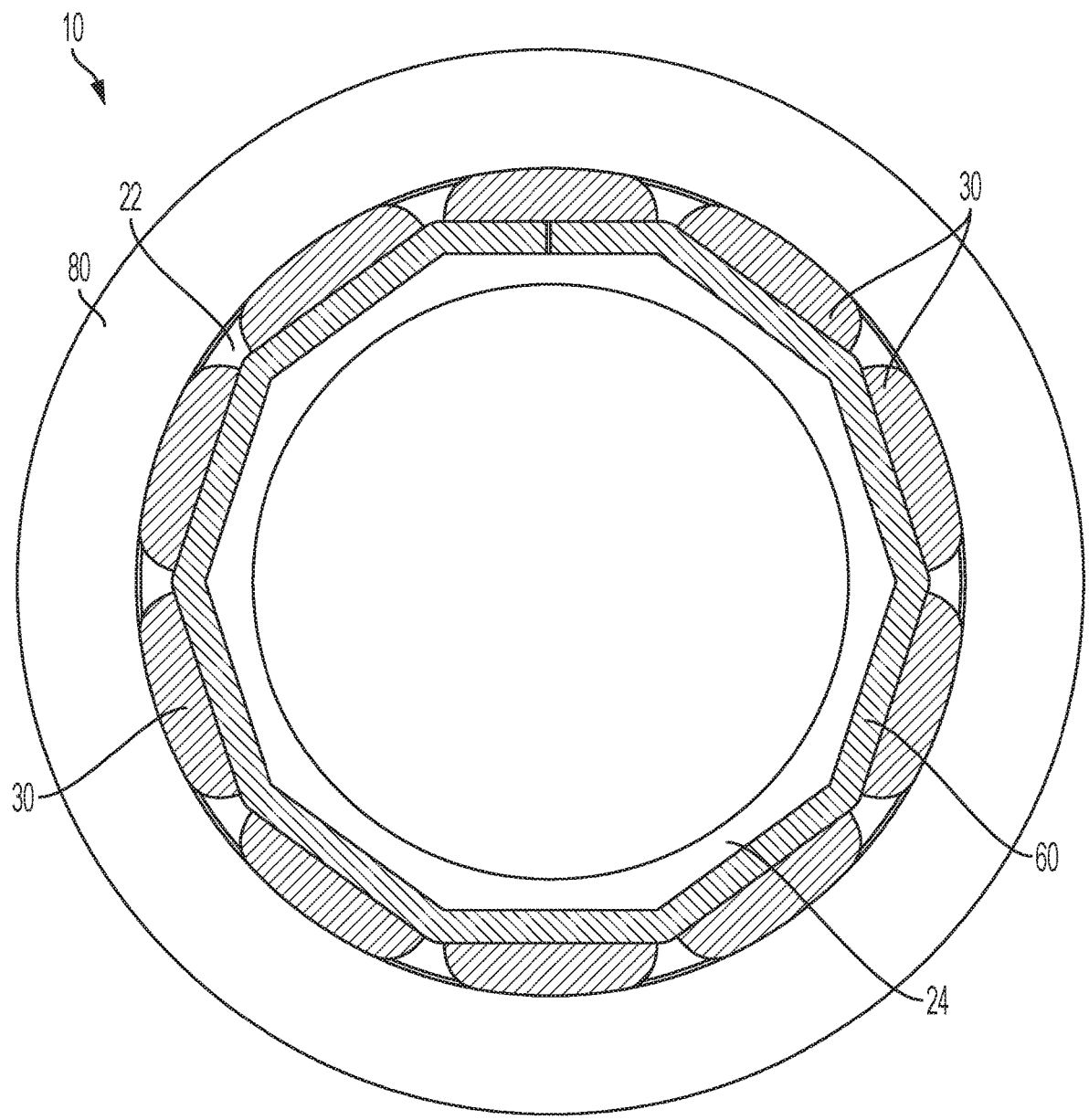

In addition, the over-molded body 80 can be adjusted as to how much engagement it has with each individual element. For example, the over-molded body 80 can extend to be flush with a top surface of the sensor ring 50 or have a gap 52 from the top surface of the sensor ring 50, as shown in FIG. 3. This further allows adjustment of the weight of the overall rotor assembly 10 as well as allowing mitigation of any fan effects created by the rotating sensor ring 50.

Figure 2C:
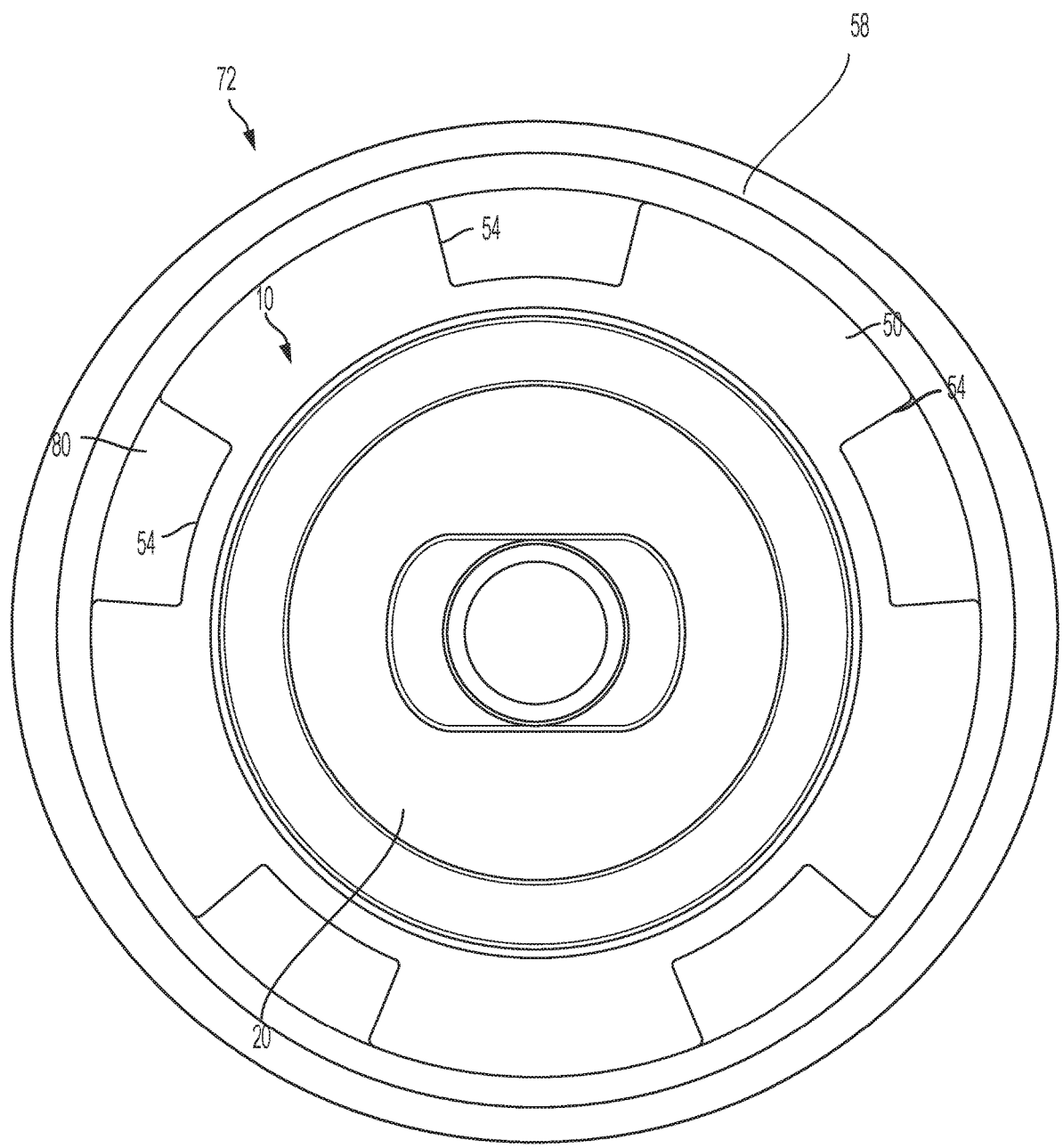
FIG. 2c is a top view of the rotor assembly of FIG. 1.

As best shown in FIG. 2c, the sensor ring 50 is a generally annular shape with planar body. The sensor ring 50 has a plurality of cut-outs 54 that allow a sensor of the motor to determine rotation and/or position of the rotor assembly 10. The sensor ring 50 is a metallic structure and can be formed by a variety of means. For example, the sensor ring 50 can be formed by a stamping process. Other rotor assemblies have previously formed a sensor ring as an integral part of a rotor body.

These rotor assemblies are often deep-drawn to create the body. However, this process often causes uneven thickness of the sensor ring due to necking of the metal in a deep-draw process. This can have negative consequences in obtaining a signal from the sensor ring. In the present disclosure, a stamping process will result in a uniform thickness that is advantageous for signal reading of the sensor ring 50.

The modular design of the present disclosure has further advantages over existing rotor assemblies that have an integral body, rotor shaft, and sensor ring. For example, the sensor ring 50 can be made of a material optimized for the sensor while the rotor shaft 20 can be made of a different material optimized for strength or weight. Further, the components can be individually changed and optimized without requiring a change to the entire assembly.

With reference back to FIG. 20, it is understood that the present disclosure also provides a motor 72 having a stator 58; and a rotor 10 having a sensor ring 50, a rotor shaft 20 and an over-molded body 80 configured to couple the sensor ring 50 to the rotor shaft 20. The motor 72 may further include at least one magnet (see element 30 in FIG. 2A) coupled to the sensor ring 50 via the over-molded body 80. The at least one magnet 30 may also be coupled to the rotor shaft 20 via the over-molded body 80 as shown in FIG. 2A. The motor 72 of this embodiment may further include a magnet support 60 (see FIG. 3) at least partially disposed within the over-molded body 80 wherein the over-molded body 80 couples the magnet support 60 to the at least one magnet 30.

Moreover, at least one protrusion 82 (see FIG. 2A) may defined in the over-molded body 80 in the motor's rotor 10 wherein one or more of the protrusions 82 is removable and is configured to balance the motor 72. It is understood that the protrusion(s) 82 may be defined on an outer surface 32 of the over-molded body 80 as shown in FIG. 2A.

Figure 5A:
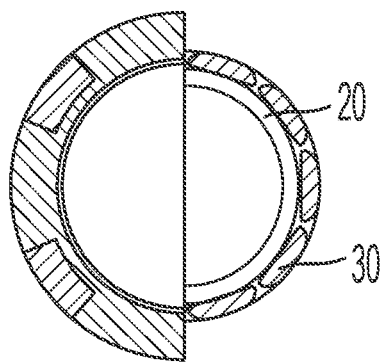
FIG. 5b is a cross-sectional view of the rotor assembly of FIG. 5d along line 5b-5b.
FIG. 5c is a side/cross-sectional view of an example embodiment rotor assembly where the rotor shaft has an integral magnet support (or core).
FIG. 5d is a side/cross-sectional view of another embodiment rotor assembly where the rotor shaft engages with a separate magnet support (or core) via a plurality of teeth.
FIG. 5e is an expanded view of an example embodiment of the present disclosure.
Figure 5B:
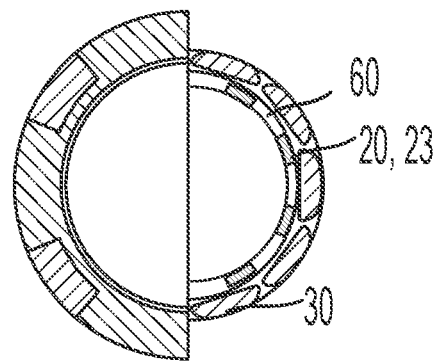
Figure 5C:
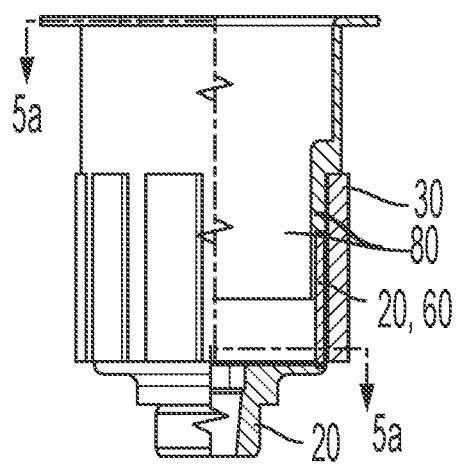

Referring now to FIG. 3 a cross-sectional view taken along the line 3-3 of FIG. 2a where a magnet support 60 is affixed to the rotor shaft 20 via a laser weld or the like. Alternative to being laser welded to the rotor shaft 20, FIG. 5c is a side/cross-sectional view of an example embodiment rotor assembly where the rotor shaft has an integral magnet support (or core) 60. FIG. 5a is a cross-sectional view of the rotor assembly of FIG. 5c along line 5a-5a to better illustrate where the magnets are disposed relative to the rotor shaft. In this arrangement shown in FIGS. 3, 5a and 5c, there are no teeth (see FIG. 5e) defined in the rotor shaft.

Figure 5D:
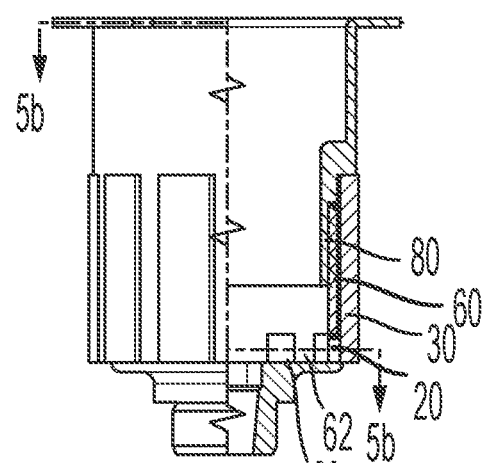
Figure 5E:
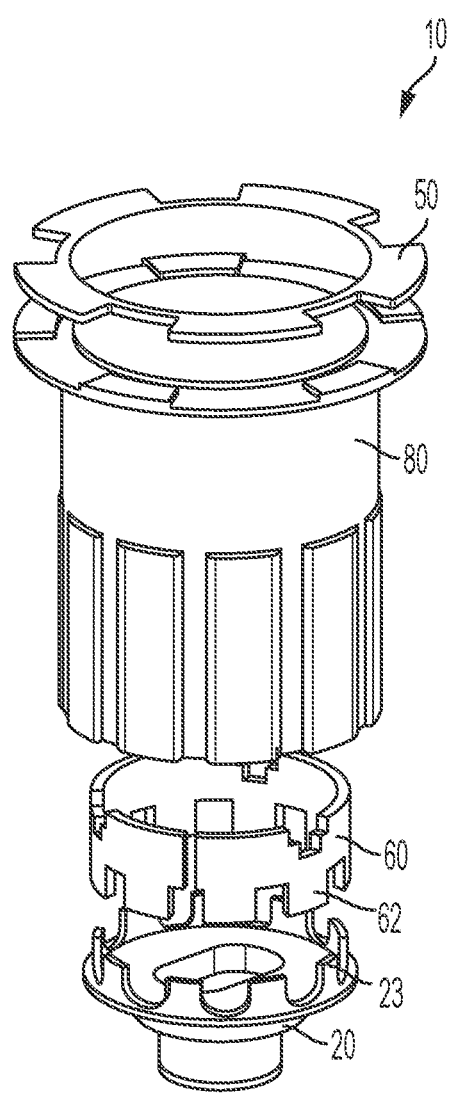

Referring now to FIG. 5d, FIG. 5d is a side/cross-sectional view of another embodiment rotor assembly 10 where the rotor shaft 20 engages with a separate magnet support (or core) 60 via a plurality of teeth 23 defined in the rotor shaft 20. FIG. 5b is a cross-sectional view of the rotor assembly of FIG. 5d along line 5b-5b to better illustrate where the magnet support 60 is disposed relative to the magnets 30, magnet support 60, and the rotor shaft 20. In this arrangement shown in FIGS. 5b and 5d, there are teeth 23 (see FIG. 5e) defined in the rotor shaft which engage with complementary magnet support teeth 62 in the magnet support 60. See also FIG. 5e.

The principle and mode of operation of this disclosure have been explained and illustrated in its preferred embodiment. However, it must be understood that this disclosure may be practiced otherwise than as specifically explained and illustrated without departing from its spirit or scope.

What is claimed is:

1. A rotor assembly for a motor comprising:
    a sensor ring;
    a rotor shaft;
    a magnet support;
    at least one magnet supported on the magnet support; and
    an over-molded body over-molded onto the sensor ring, the rotor shaft, the magnet support and the at least one magnet to couple the sensor ring, the rotor shaft, the magnet support and the at least one magnet together.

2. The rotor assembly according to claim 1, further comprising at least one radially extending protrusion defined in the over-molded body, the at least one radially extending protrusion being configured to balance the rotor.

3. The rotor assembly according to claim 2, wherein the at least one protrusion is defined on and extends radially from an outer surface of the over-molded body.

4. A motor comprising:
    a stator; and
    a rotor having a sensor ring, a rotor shaft, a magnet support, at least one magnet and an over-molded body, the at least one magnet being supported on the magnet support, the over-molded body being over-molded onto the sensor ring, the rotor shaft, the magnet support and the at least one magnet to couple the sensor ring, the rotor shaft, the magnet support and the at least one magnet together.

5. The motor according to claim 4, further comprising at least one radially extending protrusion defined in the over-molded body, wherein the at least one radially extending protrusion is removable and is configured to balance the motor.

6. The motor according to claim 5, wherein the at least one protrusion is defined on and extends radially from an outer surface of the over-molded body.

7. The motor according to claim 4, wherein the stator circumferentially surrounds at least a portion of the rotor.

8. The motor according to claim 4, wherein the rotor shaft and the magnet support are integrally formed as a single piece.

9. The motor according to claim 4, wherein the rotor shaft includes a plurality of teeth engaged with a plurality of magnet support teeth of the magnet support.

10. The rotor assembly according to claim 1, wherein the rotor shaft and the magnet support are integrally formed as a single piece.

11. The rotor assembly according to claim 1, wherein the rotor shaft includes a plurality of teeth engaged with a plurality of magnet support teeth of the magnet support.

* * * * *